Patented Jan. 10, 1939

2,143,364

UNITED STATES PATENT OFFICE 2,143,364

PROCESS FOR EFFECTING CATALYTIC REACTIONS

Marion D. Taylor, Berkeley, Calif., assignor to Shell Development Company, San Francisco, Calif., a corporation of Delaware No Drawing. Application September 28, 1935, Serial No. 42,677

14 Claims. (Cl. 260—676)

This invention relates to the execution of catalytic chemical reactions and to the reactivation of poisoned catalytic materials. More particularly, the invention relates to a practical and effective method of employing active catalytic materials in catalytic operations wherein at least a part of the material to be acted upon contains an impurity, which causes a decrease in the activity of the catalyst by forming a loose association therewith, in such an amount that the catalytic material would ordinarily be rendered substantially inactive in a relatively short period of time.

The invention provides, in general, a practical process for indefinitely prolonging the life of active catalytic materials and substantially maintaining their catalytic activity within a practical operating range while employing such catalytic materials, for at least a part of the time, in contact with fluid materials acted upon which contain an impurity, capable of poisoning the catalyst and thereby progressively decreasing its activity by forming a loose association therewith, in an amount greater than can be tolerated by the catalytic material without substantial loss of activity.

An object of my invention is to provide a continuous or intermittent process for executing catalytic chemical reactions in the presence of impurities which deleteriously effect the activity of the catalyst employed by forming a loose association therewith which comprises the steps of alternately passing fluid material to be acted upon which contains the catalyst-poisoning impurity in a greater amount than can be tolerated by the catalyst without substantial loss of activity, and fluid material containing substantially less than the critical concentration of the impurity which can be tolerated by the catalyst without loss of activity, into contact with the catalytic material under reaction conditions, whereby the catalytic reaction is executed while the activity of the catalyst is maintained within a predetermined practical operating range.

The principle of the invention is as follows: When the fluid material containing a greater than critical concentration of the catalyst-poisoning impurity is passed into contact with the active catalytic material under operating conditions the reaction is effected and the rate of reaction progressively decreases due to poisoning of the catalyst by the impurity forming a loose association therewith. The operation is continued until the activity of the catalyst has decreased to a predetermined practical minimum value. The point to which the activity of the catalytic material may be permitted to decrease will be dependent upon the particular catalyst employed, upon the particular catalyst-poisoning impurity present in the reaction mixture and upon the range of activity in which it is desired to operate. For each catalyst, there is usually a minimum critical activity. If the activity of the catalyst is decreased below this minimum critical activity, the catalyst is difficult and sometimes impossible to reactivate. Accordingly, in the execution of the invention, I do not permit the activity of the catalyst to decrease to its minimum critical activity, but only to the extent that the activity can be readily and substantially completely restored by the methods herein described. When the material containing more than the critical concentration of the catalyst-poisoning impurity has been treated until the catalyst activity has decreased to a minimum practical value, said material is replaced by material containing substantially less than the critical concentration of the catalyst-poisoning impurity. It appears that when the fluid material containing less than the critical concentration of the impurity is contacted with the partially poisoned catalyst under substantially the same conditions at which the reaction was effected when the poisoning occurred, the catalyst-poisoning impurity is released from its loose association with the catalyst and the activity of the catalyst is progressively restored. The reaction is effected with the material containing less than a critical concentration of the catalyst-poisoning impurity until the catalyst has been reactivated to the desired extent. The cycle may then be repeated as described whereby the activity of the catalyst is maintained within a predetermined practical operating range.

For each catalytic material which suffers a loss in activity by forming a loose association with a catalyst-poisoning impurity, there is a certain minimum concentration of the catalyst poison which may be present in the fluid material in contact with the catalyst without deleteriously effecting its activity. The term "critical concentration" is used in this specification and the appended claims to designate this minimum concentration which can be tolerated by the catalyst. The present invention is concerned with the treatment, in the presence of active catalysts, of fluid reactants which contain catalyst-poisoning impurities of such a nature that they poison the catalyst and cause its activity to decrease by forming a loose association therewith. The term "loose association" as used in this application is intended to embrace any combination of the catalyst-poisoning impurity and the catalyst which is formed when the catalyst poison is present in the material in a greater than critical concentration and broken up releasing the catalyst poison in the same or a different form when the partially poisoned catalyst is used in the presence of a fluid reactant containing less than the critical concentration of the impurity. For example, the loose combination may comprise a compound of the impurity with the catalyst, which compound is unstable in the presence of the fluid reactant containing less than the critical concentration of the impurity, or the impurity may be deposited upon the surface of the catalyst when the reactant contains more than a critical concentration and released when it contains less than a critical concentration.

As the description of my invention proceeds, it will be seen that numerous material advantages are inherent in the process as applied to catalytic operations in general, and particularly as applied to catalytic operations wherein the active and easily poisoned metal and metal compound catalysts are used to accelerate reactions involving fluid reactants which contain relatively small amounts of difficulty removable impurities which deleteriously effect the activity of the catalysts. The catalyst-poisoning impurities, which poison the catalyst by forming a loose association therewith, likely to be encountered in technical scale catalytic processes are sulphur, phosphorus, selenium, arsenic, etc., and the compounds of these elements, particularly the compounds of sulphur, arsenic, selenium and the organic halides and, in some cases the carbon oxides and organic acids.

In accordance with the known methods of effecting catalytic operations, the use of the more active metal and metal compound catalysts is many times impractical due to their relatively short life when the materials undergoing treatment contain relatively small amounts of catalyst-poisoning impurities. To render the use of such active catalysts practical, it has heretofore been necessary that the entire bulk of material to be contacted with the catalyst be subjected to costly and difficult purification treatments, or that large quantities of the catalytic material be used and periodically regenerated by costly methods as reforming.

In accordance with my invention, the active and easily poisoned catalysts can be utilized while material savings in purification and catalyst costs are realized. By utilizing the principles of my invention and alternating material containing more than a critical concentration of the catalyst poison with material containing less than a critical concentration, the catalyst activity is maintained within a practical operating range while only a part of the material undergoing treatment need be purified to the extent that it contains less than a critical concentration of the catalyst poison. The cycle may be repeated as many times and as often as necessary to maintain the activity of the catalyst within the desired range. In the catalyst reactivation stage of the process, the catalyst may in many cases be reactivated to the extent that it possesses is initial activity or the activity it would have possessed if substantially poison-free reactants had been used exclusively.

The present invention, while it finds perhaps its most important field of usefulness in the catalytic hydrogenation, catalytic oxidation, and catalytic reduction of organic compounds, is nevertheless generally applicable to all catalytic operations employing a catalyst susceptible to poisoning by forming a loose association with one or more impurities in the material or materials acted upon. The reaction or reactions involved may be endothermic or exothermic and they may be effected in the liquid, vapor or liquid vapor phase, and involve organic and/or inorganic materials. Regardless of the nature and conditions of the catalytic operation, the general procedure to maintain the active life of the catalyst is substantially the same.

The following list of representative catalytic operations is not intended in any sense to limit the scope of the invention but to serve as an indication of a few representative classes of catalytic operations in which the important catalyst activity-maintaining and catalyst reactivation features of the present invention may be effectively utilized.

The principles of the invention are applicable to the most varied types of catalytic reactions, such as:

1. Hydrogenation reactions wherein hydrogen is added to an ethylenic linkage as in an organic compound such as the olefines, olefine polymers, diolefines, olefine condensation products, unsaturated alicyclic compounds, unsaturated alcohols, unsaturated ethers, unsaturated esters, unsaturated ketones, unsaturated aldehydes, unsaturated esters and the like. Reactions wherein hydrogen is added to an acetylenic linkage contained in an organic oxy-compound or hydrocarbon. Reactions wherein hydrogen is added to a triple bond between a carbon and a nitrogen atom, as the hydrogenation of nitriles to amines. Reactions involving the addition of hydrogen to the quadruple bond between a carbon and a nitrogen atom as the catalytic conversion of carbylamines to secondary amines. The addition of hydrogen to the carbonyl group as in the hydrogenation of aldehydes and ketones to the corresponding primary and secondary alcohols; keto-acids to internal esters and the like. Hydrogenation of oxides, as ethylene oxide, to the corresponding alcohols. The addition of hydrogen to the aromatic nucleus as the conversion of benzene to cyclohexane, styrene to ethyl benzene, diphenyl to phenyl-cyclohexane, hydroquinone to cyclohexadiol, aniline to cyclohexylamine, naphthalene to tetrahydronaphthalene and naphthane, etc.

2. Simultaneous hydrogenations and dehydrogenations wherein an unsaturated compound capable of being hydrogenated is contacted with a hydrogenation catalyst in the presence of a compound capable of being dehydrogenated under the same conditions. For example, a mixture of diisobutylene and secondary butyl alcohol may be contacted with a hydrogenation catalyst under such conditions that the diisobutylene is hydrogenated to an iso-octane while the alcohol is dehydrogenated to methyl ethyl ketone.

3. Dehydrogenation reactions involving the catalytic elimination of molecular hydrogen from organic compounds by contact with a dehydrogenation catalyst. For example, the dehydrogenation of hydrocarbons of the paraffin series to the corresponding olefines, as propane to propylene, butane to butylene, pentane to amylene, cyclohexane to tetrahydrobenzene, ethyl benzene to styrene, etc. Other catalytic dehydrogenations to which the principles of the invention are applicable involve the elimination of hydrogen from primary and secondary alcohols to yield the corresponding aldehydes and ketones, respectively. For example, the dehydrogenation of ethyl alcohol to acetaldehyde, isopropyl alcohol to acetone, secondary butyl alcohol to methyl ethyl ketone, isobutyl alcohol to isobutyraldehyde, borneol and isoborneol to camphor, cyclohexanol to cyclohexanone, fenchyl alcohol to fenchone, etc.

4. Oxidation reactions, such as, the oxidation of hydrocarbons to alcohols, aldehydes, ketones, acids, etc. The oxidation of alcohols to aldehydes and ketones, acids, etc. The oxidation of aldehydes and ketones to carboxylic acids. For example, oxidation of methane to methyl alcohol, formaldehyde, formic acid, etc., oxidation of isobutenol to isobutenal, isobutyraldehyde to isobutyric acid, etc. The oxidation of benzol, toluol, phenol and the like compounds to maleic acid and fumaric acid or mesotartaric acid; cresol to salicylaldehyde and salicyclic acid; toluol to the corresponding aldehyde or acid; eugenol and isoeugenol to vanillin and vanillic acid; ethylene chlorhydrin to chloracetic acid and the like.

5. Reduction reactions which may or may not involve the fixation of hydrogen to the product. For example, the reduction of benzyl alcohol to toluene, phenol to benzene, cresol to toluene, furfuryl alcohol to methyl furfurane, etc. The reduction of nitrogen oxides and nitro-compounds to ammonia; nitrous acid esters, oximes and amides to amines; dibasic acids to lactones; carbon oxides to methanol, methane and higher hydrocarbons, etc.

In addition to reactions in which a more or less homogeneous raw material is reduced, certain mixtures of raw materials may be effectively reduced in the presence of active catalysts with or without the presence of additional reducing gases. For example, oxides of carbon may be reduced in the presence of many organic compounds. The present invention is applicable to such reductions in the presence of hydrocarbons as the paraffins, olefines, acetylinic compounds, etc. The reductions may be effected in the presence or absence of hydrogen. Another class of combined reactions consists in the reduction of oxides of carbon with or without hydrogen in the presence of saturated or unsaturated aliphatic, aralkyl and alicyclic alcohols of monohydric or polyhydric character.

In the field of inorganic catalytic synthesis, reaction of hydrogen with nitrogen to form ammonia, oxidation of ammonia to nitrogen oxides and the like processes are effectively and economically executed in accordance with the present invention. The same is also applicable to the catalytic production of hydrocyanic acid from carbon monoxide and ammonia, the catalytic oxidation of sulphur dioxide to sulphur trioxide, the catalytic water gas process, and the catalytic purification of gases.

For the purpose of illustrating the principles of my invention and the modes of executing the same, the invention will be described with particular reference to a catalytic hydrogenation process. It is, however, to be understood that I am merely illustrating a specific embodiment of the invention, and that the same is broadly applicable to catalytic processes in general.

In accordance with my invention, I may hydrogenate any hydrogenatable unsaturated organic compound regardless of the source of said compound. The compound to be hydrogenated may be an unsaturated oxy-compound as an unsaturated alcohol, ether, ester, acid, aldehyde, ketone, etc.; an unsaturated hydrocarbon as the aromatic compounds, the aralkyl compounds, the acetylinic compounds, the olefines, the olefine polymers, the olefine condensation products, the olefine addition and suitable substitution products, the polyolefines and the like. In the hydrogenation of unsaturated compounds, the corresponding completely saturated or more saturated compounds are usually obtained. Saturated as well as unsaturated aldehydes, ketones and olefine oxides may be hydrogenated to the corresponding saturated primary and secondary alcohols. The materials may be hydrogenated severally or mixtures may be treated.

My invention is applicable with excellent results to the hydrogenation of the higher olefines, and to the hydrogenation of olefine co-polymerization and olefine inter-polymerization products. Such olefinic compounds, particularly those of branched chain structure, may be hydrogenated to valuable saturated hydrocarbons which are useful as motor fuels and as components of motor fuel and lubricating oil compositions, as solvents, raw materials for resin production, etc.

The olefine co-polymers are the aliphatic olefinic compounds as dipropylene, tripropylene, diisobutylene, triisobutylene, di-secondary butylene, the di- and triamylenes, the dihexylenes, the diheptylenes and the like polymers resulting from the polymerization of an olefine with one or more molecules of a similar olefine.

The inter-polymerization products of olefines are the branched chain unsaturated compounds or mixtures thereof obtainable by causing an olefine to polymerize with a dissimilar olefine. Olefine inter-polymerization products are obtainable by reacting a tertiary base olefine with ethylene, with a secondary base butylene or with a tertiary base olefine containing a different number of carbon atoms, or a secondary base olefine may be reacted with ethylene or with a dissimilar secondary base olefine. For example, valuable branched chain octanes may be obtained by inter-polymerizing isobutylene with buten-1 and/or buten-2, and hydrogenating the products in accordance with the present invention.

By application of the principles of my invention, unsaturated materials as the olefines, olefine polymers, etc. which contain catalyst poisons due to their source, mode of preparation, mode of purification, etc., may be practically and economically hydrogenated, since said materials can be treated in the presence of easily poisoned catalytic materials without the necessity of treating the entire bulk of the material to be hydrogenated and the hydrogen or hydrogen supplying material for complete or substantially complete removal of the catalyst poison or poisons therefrom. The olefines and products thereof, as the polymers, which are produced commercially from petroleum, petroleum products and other natural sources as the cracking of animal and vegetable oils, decomposition of coal, peat, pitch, tar, etc. are many times contaminated with sulphur, sulphur compounds, arsenic, arsenic compounds and the like, which impurities are in many cases difficult to remove economically to the extent that catalysts sensitive to poisoning, as nickel, iron, cobalt, the metals of the platinum group, etc. do not suffer a rapid and substantial loss of catalytic activity. Substantially complete purification of the entire bulk of the reactants is in most cases a costly and time-consuming operation. In operating in accordance with my invention, only a part of the materials treated need be substantially free of catalyst poisons, that is, contain less than the critical concentration of the catalyst-poisoning impurities.

I have found that a metallic nickel catalyst, the activity of which has been materially impaired by contact with materials containing sulphur compounds in prohibitive amounts, can be restored to substantially its original activity, on contact for a sufficient period of time under hydrogenation conditions with material free of catalyst poisons or containing said poison or poisons in an amount below the critical concentration of the catalyst for said poison or poisons. Thus, in the hydrogenation of diisobutylene, I have found that if the total sulphur content of the diisobutylene is less than about 0.01% S (lamp method), an active nickel metal catalyst can be used for an indefinite period of time with substantially no loss in activity. However, when the total sulphur content of the diisobutylene is equal to or greater than about 0.01% S, the catalyst suffers a rapid loss in activity due to poisoning occasioned by the sulphur compounds and/or sulphur forming a loose association therewith. In the latter case, when the activity of the catalyst has decreased to the extent that the rate of conversion is no longer practical, said catalyst may be restored to substantially its initial activity by replacing the diisobutylene containing more than about 0.01% total sulphur with diisobutylene containing less than about 0.01% total sulphur, and containing the hydrogenation. This cycle, alternating contaminated material with material containing less than the critical concentration of the impurity deleterious to the activity of the catalyst, can be repeated when and as often as necessary or desirable. Different materials may be treated alternately in the process. For example, an unsaturated hydrocarbon containing more than a critical concentration of the catalyst poison may be alternated as herein described with another species of hydrocarbon, an unsaturated alcohol, ether, ester, etc., containing less than a critical concentration of the poison, whereby one or a plurality of materials is/are hydrogenated while the activity of the catalyst is maintained.

In the case that the material to be hydrogenated does not contain a catalyst poison in a concentration sufficiently high to deleteriously effect the activity of the catalyst, I need not, to avoid catalyst poisoning, use only pure or substantially purified hydrogen or hydrogen-containing gas mixtures. I may realize material savings in operating and purification costs by alternately applying pure and impure hydrogen in the manner as above described. For example, by-product hydrogen obtainable by the dehydrogenation of hydrocarbons, alcohols, etc., and gases obtainable by the dissociation of ammonia and the like, which hydrogen or hydrogen-containing gas contains more than the critical amount of the catalyst-poisoning impurity, may be used in the manner described to replace a major portion of the substantially pure hydrogen ordinarily required. In the hydrogenation of diisobutylene to isooctane, I may replace about 80% to 90% of the pure electrolytically produced hydrogen ordinarily required with by-product hydrogen obtained by the dehydrogenation of alcohols without reducing the yield of iso-octane per pound of catalyst below the yield obtainable if pure hydrogen were used throughout the operation.

The invention is applicable to liquid, vapor or liquid-vapor phase operations. The temperature to be employed will be dependent upon the material to be hydrogenated, upon the phase in which reaction is effected, upon the pressure of operation, upon the stability of the reactants and products, upon the contact time and upon the activity of the particular catalyst or catalyst composition. Since undesirable side reactions are accelerated at the higher temperature, I preferably employ temperatures not exceeding about 500° C. When active catalysts as nickel and the like are used, temperatures of from about 100° C. to about 300° C. are usually suitable. With some of the more active noble metal catalysts, as colloidal palladium and platinum, hydrogenation may be effected at practical rates at about room temperature.

Any suitable pressure may be used depending upon the activity of the catalyst, upon the temperature of reaction, and upon whether reaction is to be effected in the liquid or vapor phase. In some cases, the hydrogenation may be effected in the presence of relatively unreactive substances as hydrocarbons, inert gases, etc., which substances may serve as solvents and/or diluents and to facilitate temperature control, or they may be added to facilitate recovery and purification of the end product or products of reaction; or gaseous or low boiling materials may be added to permit the use of greater operating pressures than could normally be attained.

The hydrogenation is effected in the presence of a catalyst selected with respect to the material to be hydrogenated, the catalyst-poisoning impurity or impurities therein and the optimum conditions of its employment so as to permit hydrogenation at a practical rate under conditions at which undesirable side reactions are substantially obviated. The catalyst is selected with respect to the catalyst poison present so that said impurity, when it deleteriously effects the catalyst activity, does so by forming a loose association therewith which loose association is broken when the catalyst is reactivated as herein described.

Suitable catalysts which may be employed in the execution of my invention are the active metals, alloys of active metals, and active metal compounds as the metal oxides, etc. A group of active metals which may be employed per se or deposited on a suitable carrier or support includes among others nickel, iron, cobalt, chromium, thallium, thorium, manganese, tungsten, vanadium, etc. The metals may be used severally or in mixtures as alloys, etc. In additions to the above listed base metals, the noble metals as gold, silver, platinum, palladium, etc. may comprise or be contained in a suitable catalyst. Suitable metal oxides, which may be used severally or in mixtures with each other and/or ore or metals, are the oxides of the above listed base and noble metals, and particularly the oxides of nickel, cerium, thorium, chromium, titanium and zirconium.

The catalytic materials may be prepared in any suitable manner and employed per se or incorporated with or deposited upon an inert substance which serves as a carrier or support such as calcium carbonate, silica gel, kieselguhr, charcoal, infusorial earth, etc.

The following detailed examples illustrate the application of the principles to catalytic dehydrogenation processes. It is to be understood that these examples are not to be regarded as limiting the scope of the invention. With certain modifications clearly apparent to those skilled in the art, the invention is applicable in like manner to catalytic processes in general.

Example I

The hydrogenations were made in the liquid phase in a steel autoclave having a capacity of about 3 liters. The autoclave was equipped with heating means, means for agitating its contents by mechanical stirring and the necessary valves to permit charging and discharging in an atmosphere of hydrogen.

The catalyst used was finely divided nickel metal prepared by reducing and/or decomposing nickel formate suspended in a neutral oil while heating to a temperature of about 300° C. in the presence of hydrogen.

The catalyst was used in an amount equal to about 5% by weight of the diisobutylene charged to the autoclave.

About 1000 cc. of a mixture consisting of about 50% of diisobutylene and 50% of iso-octane and containing less than about 0.010% total sulphur, as determined by the lamp method was charged to the autoclave and the requisite quantity of catalyst added. Substantially pure hydrogen was applied under pressure and the contents of the autoclave stirred and heated. At a temperature of about 150° C. and a gauge pressure of about 500 lbs./sq. in., the hydrogenation reaction was substantially complete in about 15 minutes. A sample, sufficient for analysis (Francis bromine number), was withdrawn at periods of 5, 10 and 15 minutes. It was found that with the mixture treated, which contained about 0.008% total sulphur, there was no appreciable loss of catalyst activity after 11 successive runs.

The twelfth run was made with a mixture of diisobutylene and iso-octane containing about 0.012% total sulphur. The hydrogenation was made under the same conditions as runs 1 to 11. There was a marked decrease in activity of the catalyst as indicated by analysis of samples withdrawn at periods of about 5, 10 and 15 minutes from the start of the reaction.

Runs 13 and 14 were made successively under substantially the same conditions with mixtures containing about 0.012% total sulphur and 0.010% total sulphur, respectively. The results showed a progressive decrease in activity of the catalyst. The results of runs 1 to 16 are shown, for purposes of comparison, in the following table.

| Run number | Percent sulphur in reaction mixture* | Percent sulphur in product* | Percent iso-octane | | |
|---|---|---|---|---|---|
| | | | 5 min. | 10 min. | 15 min. |
| 1 to 11 | 0.008 | 0.008 | 90.00 | 98.75 | 99.75 |
| 12 | 0.012 | 0.009 | 86.27 | 97.50 | 99.00 |
| 13 | 0.012 | 0.008 | 79.55 | 91.75 | 98.00 |
| 14 | 0.010 | 0.010 | 74.30 | 87.90 | 97.00 |
| 15 | 0.008 | 0.009 | 90.00 | 98.75 | 99.75 |
| 16 | 0.008 | 0.008 | 90.00 | 98.75 | 99.75 |

* Total sulphur by lamp method.

At the end of run 14 all of the material was removed from the autoclave and it was charged with the same stock used in runs 1 to 11 which contained only about 0.008% total sulphur. The results of runs 15 and 16 show that the initial activity of the catalyst is substantially restored when material containing less than the critical amount of sulphur is again used.

Example II

Diisobutylene was hydrogenated to iso-octane (2,4,4-trimethyl pentane) using substantially the same catalyst and equipment and operating in substantially the same manner as described in Example I. In this example, a diisobutylene stock containing less than about 0.010% total sulphur as determined by the lamp method was used throughout the runs.

About 1000 cc. of a mixture consisting of 50% diisobutylene and about 50% iso-octane was charged to a suitable autoclave and an amount of nickel catalyst equal to about 5% by weight of the diisobutylene was added. The hydrogen used was a by-product hydrogen from a catalytic dehydrogenation process. Prior to its use the by-product hydrogen was passed through an aqueous sodium hydroxide solution and then contacted with nickel at an elevated temperature to remove CO and/or $O_2$. The hydrogenations were effected in the liquid phase at a temperature of about 175° C. and a pressure of about 250 lbs./sq. in. (gauge).

After the same catalyst had been used with the by-product hydrogen to effect 78 successive hydrogenations, the activity of the catalyst had decreased to the extent that after an initial charge of material had been treated for 10 minutes only 77.5% of the diisobutylene was hydrogenated while after 15 minutes of treatment only 86.0% was hydrogenated.

In the next successive run, the by-product hydrogen was replaced by a pure electrolytically produced hydrogen. After this pure hydrogen had been used for three successive runs, the activity of the catalyst was restored to the extent that in 10 minutes about 92% of the diisobutylene was hydrogenated and after 15 minutes 98.5% was hydrogenated. The pure hydrogen was then replaced by the by-product hydrogen and 21 runs made therewith. By this time the activity of the catalyst had decreased to the extent that in 10 minutes the conversion was about 46% and in 15 minutes about 59%. The by-product hydrogen was then replaced by pure hydrogen and the series of runs continued. After 4 runs with the pure hydrogen, the catalyst had been reactivated to the extent that an 89.0% conversion was effected after about 10 minutes and a 97.7% conversion after about 15 minutes.

In operating as above described, a total of about 331 gallons of iso-octane were prepared per pound of catalyst used. Of the 331 gallons of iso-octane, 283 gallons or 85.5% was prepared using the contaminated by-product hydrogen. Thus by using pure electrolytic hydrogen from time to time to restore the activity of the catalyst, a practical conversion rate was maintained while using the treated impure hydrogen about 85% of the time. The by-product hydrogen can be used without subjecting it to a preliminary purification treatment; however, with the untreated hydrogen more frequent replacement by pure hydrogen is required.

Although the above-described hydrogenations were made with a nickel catalyst in the liquid phase, it is to be understood that other catalysts may be used and that the general procedure is substantially the same when vapor phase methods of operation are used. The process of the invention may be executed in a batch, intermittent or continuous manner.

While I have described my invention in a detailed manner and provided specific examples illustrating suitable modes of executing the same with reference to hydrogenation, it is to be understood that the same with appropriate modifications is applicable broadly to catalytic reaction systems and that no limitations on the scope of the invention other than those imposed by the appended claims are intended.

It is understood that the organic material which is worked upon in the alternating operating steps of the claims is employed in a molal concentration which is substantially the same in said alternating steps and the expression "mol ratio of the reactants" is intended to feature such substantial maintenance of concentration.

I claim as my invention:

1. In a process for effecting catalytic chemical reactions involving at least one organic reactant in the presence of impurities which deleteriously affect the activity of the catalyst by forming a loose association therewith, the steps which comprise passing a fluid reactant which contains more than a critical concentration of the catalyst-poisoning impurity into contact with the catalyst under reaction conditions until the activity of the catalyst has decreased to about a minimum practical value, and then passing the same fluid reactant containing substantially less than a critical concentration of the catalyst-poisoning impurity into contact with the catalyst under reaction conditions and while effecting said catalytic chemical reaction with the mol ratio of the reactants substantially the same as in the execution of the first step of the process until the activity of the catalyst has been restored to a predetermined optimum practical value, and repeating the cycle as described while maintaining the activity of the catalyst within a practical operating range.

2. In a process for effecting catalytic chemical reactions involving at least one organic reactant in the presence of impurities which deleteriously affect the activity of the catalyst by forming a loose association therewith, the steps which comprise passing a fluid reactant which contains more than a critical concentration of the catalyst-poisoning impurity into contact with the catalyst under reaction conditions until the activity of the catalyst has decreased to about a minimum practical value, and then passing the same fluid reactant containing substantially less than a critical concentration of the catalyst-poisoning impurity into contact with the catalyst under reaction conditions and while effecting said catalytic chemical reaction with the mol ratio of the reactants substantially the same as in the execution of the first step of the process until the activity of the catalyst has been restored to a predetermined optimum practical value, and repeating the cycle as described whereby the activity of the catalyst is alternately depressed and elevated but maintained within a practical operating range.

3. In a process for effecting a catalytic dehydrogenation of an organic compound in the presence of impurities which deleteriously affect the activity of the dehydrogenation catalyst by forming a loose association therewith, the steps which comprise passing a fluid dehydrogenatable material containing more than a critical concentration of a catalyst-poisoning impurity into contact with the catalyst under dehydrogenating conditions until the activity of the catalyst has decreased below a predetermined practical value, and then passing a dehydrogenatable fluid material of substantially the same character containing substantially less than a critical concentration of the catalyst-poisoning impurity into contact with the catalyst under dehydrogenating conditions and while effecting said catalytic dehydrogenation with the mol ratio of the reactants substantially the same as in the execution of the first step of the process until its activity has been restored to a predetermined optimum practical value, and repeating the cycle as described while maintaining the activity of the catalyst within a practical operating range.

4. In a process for effecting a catalytic hydrogenation of an organic compound in the presence of impurities which deleteriously affect the activity of the hydrogenation catalyst by forming a loose association therewith, the steps which comprise passing a fluid mixture of reactants containing more than a critical concentration of a catalyst-poisoning impurity into contact with the catalyst under hydrogenating conditions until the activity of the catalyst has decreased below a predetermined practical value, and then passing a fluid mixture of reactants of substantially the same character containing substantially less than a critical concentration of the catalyst-poisoning impurity into contact with the catalyst and while effecting the catalytic hydrogenation with the mol ratio of the reactants substantially the same as in the execution of the first step of the process under hydrogenating conditions until the activity of the catalyst has been restored to a predetermined optimum practical value, and repeating the cycle as described while maintaining the activity of the catalyst within a practical operating range.

5. In a process for effecting the catalytic hydrogenation of an unsaturated organic compound containing a catalyst-poisoning impurity which decreases the activity of the hydrogenation catalyst by forming a loose association therewith, the steps which comprise passing the fluid unsaturated material which contains the catalyst-poisoning impurity in more than a critical concentration together with hydrogen into contact with the catalyst under hydrogenating conditions until the activity of the catalyst has decreased to a predetermined minimum practical value, and then passing the same fluid unsaturated material containing substantially less than a critical concentration of the catalyst-poisoning impurity together with hydrogen into contact with the catalyst under hydrogenation conditions and while effecting the catalytic hydrogenation with the mol ratio of the reactants substantially the same as in the execution of the first step of the process until the activity of the catalyst has been restored to a predetermined optimum practical value, and repeating the cycle as described while maintaining the activity of the catalyst within a practical operating range.

6. A process for hydrogenating an unsaturated organic compound which contains more than a critical concentration of an impurity which decreases the activity of the catalyst by forming a loose association therewith, which comprises alternately passing the fluid unsaturated material containing more than a critical concentration of the catalyst-poisoning impurity and the fluid unsaturated material containing substantially less than a critical concentration of the catalyst-poisoning impurity, together with hydrogen into contact with the catalyst while hydrogenating with the mol ratio of the reactants substantially the same in the alternating steps of the process, whereby the activity of the catalyst is maintained within a predetermined practical operating range.

7. In a process for effecting the catalytic hydrogenation of a unsaturated organic compound by reacting the unsaturated compound with hydrogen in the presence of a hydrogenation catalyst, the step of employing hydrogen containing an impurity which decreases the activity of the catalyst by forming a loose association therewith which comprises passing hydrogen containing more than a critical concentration of the catalyst-poisoning impurity together with the material to be hydrogenated into contact with the catalyst under hydrogenating conditions until the activity of the catalyst has decreased to a predetermined minimum value, and then replacing said hydrogen by hydrogen containing substantially less than a critical concentration of the catalyst-poisoning impurity while continuing the hydrogenation with the mol ratio of the reactants substantially the same as in the execution of the first step of the process until the activity of the catalyst has been restored to a predetermined optimum practical value, and repeating the cycle as described while maintaining the activity of the catalyst within a predetermined practical operating range.

8. In a process for effecting the catalytic hydrogenation of an olefine to the corresponding saturated compound by reacting it with hydrogen in the presence of a hydrogenation catalyst susceptible to poisoning, the step of hydrogenating an olefine containing a catalyst-poisoning impurity which decreases the activity of the catalyst by forming a loose association therewith which comprises alternately passing the olefine containing more than a critical concentration of the catalyst-poisoning impurity and the olefine containing substantially less of the catalyst-poisoning impurity, together with hydrogen, into contact with the catalyst while effecting the hydrogenation with the mol ratio of the reactants substantially the same in the alternating steps of the process, whereby the activity of the catalyst is alternately depressed and elevated within a predetermined practical operating range.

9. A process for hydrogenating an olefine containing more than a critical concentration of sulphur compounds in the presence of a hydrogenation catalyst susceptible to poisoning by sulphur compounds, which comprises the steps of passing the olefine containing more than a critical concentration of the sulphur compounds with hydrogen into contact with the catalyst under hydrogenating conditions until the activity of the catalyst has decreased to a predetermined minimum practical value, and then passing the olefine containing substantially less than a critical concentration of the sulphur compounds with hydrogen into contact with the catalyst while hydrogenating with the mol ratio of the reactants substantially the same as in the execution of the first step of the process until the activity of the catalyst has been restored to a predetermined optimum value, and repeating the cycle as described whereby the activity of the catalyst is alternately depressed and elevated within a predetermined practical operating range.

10. In a process for catalytically hydrogenating diisobutylene to the corresponding iso-octane in the presence of an active metal catalyst when the diisobutylene contains more than a critical concentration of an impurity which poisons the catalyst by forming a loose association therewith, the steps which comprise passing the diisobutylene containing more than a critical concentration of the catalyst-poisoning impurity with hydrogen into contact with the catalyst under hydrogenating conditions until the activity of the catalyst has decreased to a predetermined minimum practical value, and then passing diisobutylene containing substantially less than a critical concentration of the catalyst-poisoning impurity with hydrogen into contact with the catalyst while hydrogenating with the mol ratio of the reactants substantially the same as in the execution of the first step of the process until the activity of the catalyst has been restored to a predetermined optimum practical value, and repeating the cycle as described whereby the activity of the catalyst is maintained within a predetermined practical operating range.

11. In a process for effecting catalytic chemical reactions involving at least one organic reactant in the presence of impurities which deleteriously affect the activity of the catalyst by forming a loose association therewith, the steps which comprise alternately passing a fluid reactant containing more than a critical concentration of a catalyst-poisoning impurity and a fluid reactant of substantially the same character containing substantially less than a critical concentration of the catalyst-poisoning impurity into contact with the catalyst under reaction conditions and while effecting said catalytic chemical reaction with the mol ratio of the reactants substantially the same in the alternating steps of the process, whereby the catalytic reaction is effected while the activity of the catalyst is maintained within a predetermined practical operating range.

12. In a process for effecting catalytic chemical reactions involving at least one organic reactant in the presence of impurities which deleteriously affect the activity of the catalyst by forming a loose association therewith, the steps which comprise alternately passing a fluid reactant containing more than a critical concentration of a catalyst-poisoning impurity and a fluid reactant of substantially the same character containing less than a critical concentration of the catalyst-poisoning impurity into contact with the catalyst under reaction conditions and while effecting said chemical reaction with the mol ratio of the reactants substantially the same in the alternating steps of the process, whereby the activity of the catalyst is alternately depressed and elevated within a predetermined practical operating range.

13. In a process for effecting catalytic chemical reactions involving at least one organic reactant in the presence of impurities which deleteriously affect the activity of the catalyst by forming a loose association therewith, the step of reactivating the catalyst after its catalytic activity has been decreased to a predetermined minimum value by contact with a fluid reactant containing more than a critical concentration of the catalyst poisoning impurity which comprises passing a fluid reactant of substantially the same character containing less than a critical concentration of the catalyst-poisoning impurity into contact with the catalyst under reaction conditions, and while effecting said catalytic chemical reaction with the mol ratio of the reactants substantially the same as in the previously treated material containing more than a critical concentration of the catalyst-poisoning impurity, until the activity of the catalyst is restored to the desired extent.

14. In a process for effecting a catalytic hydrogenation of an organic compound in the presence of a catalyst-poisoning impurity which deleteriously affects the activity of the hydrogenation catalyst by forming a loose association therewith, the method of maintaining the activity of the catalyst within a predetermined practical operating range which comprises the successive steps of alternately contacting a fluid reactant containing more than a critical concentration of the catalyst-poisoning impurity and a fluid reactant of substantially the same character which contains less than a critical concentration of the catalyst-poisoning impurity with the catalyst under hydrogenation conditions, and while effecting the hydrogenation reaction with the mol ratio of the reactants substantially the same in the alternating steps of the process.

MARION D. TAYLOR.